WILER, STURGES & McFALL.
Hose-Carriage.
No. 18,421.  Patented Oct 13, 1857.
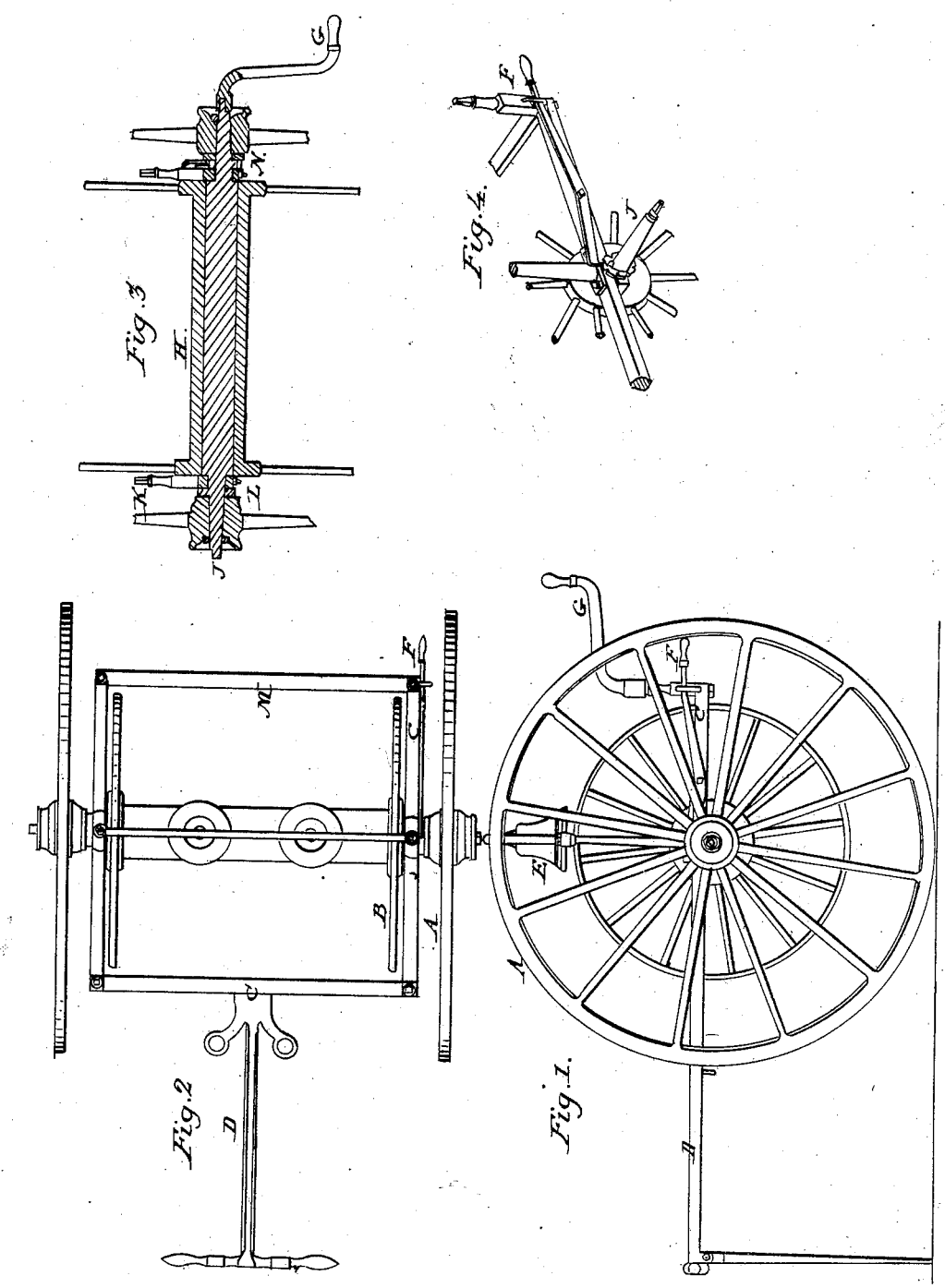

UNITED STATES PATENT OFFICE.

J. W. WILER, S. B. STURGES, AND G. McFALL, OF MANSFIELD, OHIO.

HOSE-CARRIAGE.

Specification of Letters Patent No. 18,421, dated October 13, 1857.

*To all whom it may concern:*

Be it known that we, J. W. WILER, STEPHEN B. STURGES, and GAYLORD McFALL, of the city of Mansfield, in the county of Richland and State of Ohio, have invented a new and Improved Hose-Carriage; and we do hereby declare that the following is a full and exact description thereof, reference being had to the accompanying drawings and to the letters of reference marked thereon.

Ordinary two wheeled hose carriages are so constructed that it is necessary to stand in front of the carriage in order to turn the reel in reeling up the hose. This position is very inconvenient when the carriage is in motion, as the men who are turning the reel must then walk backward. Also the common mode of turning the reel by seizing hold of the rim is both slow and difficult, especially when a hose, weighing two thousand pounds is to be reeled up.

The object of our invention is to remedy these difficulties.

Our improvement is intended chiefly for two wheeled hose carriages though it may be applied to other carriages.

Our invention consists in constructing the hose carriage so that one axle is common to both the reel and the traveling wheels and while the reel is fixed to the axle the latter will revolve freely in both the frame of the carriage and the traveling wheels.

In the accompanying drawings, Figure 1, is a side view of a hose carriage containing our invention. Fig. 2, is a plan of the same. Fig. 3, is a section of the axle and its connections. Fig. 4, is a view of a ratchet and pawl lever for locking the reel, the traveling wheel being removed from the axle and most of the reel being broken away.

In Figs. 1, and 2, a two wheeled hose carriage is represented, which may be of any ordinary form. The wheels are shown at A, the frame at C, with bells E. The rim of the reel B, and the hubs L, may be made of iron and the main axle of wood. The hubs and the axle of the reel are fixed upon the main axle I, as seen in Fig. 3, while the frame C is connected with a short journal of the axle by means of a box N, held by screws. By this arrangement the axle which is straight, may freely revolve in the wheels and frame, carrying the reel around with it. This revolution of the axle and reel does not interfere with motion of the carriage. Both ends of the axle are made square in order to receive cranks G, by which the axle and the reel are easily turned. These cranks G, afford the firemen a convenient mode of operating the reel even when the hose carriage is moving. The cranks G, when not in use may ride on standards O. The hose, when being reeled up passes over the friction roller M, and above and forward of the axle, so that the motion of the reel in reeling up the hose always corresponds to the forward motion of the wheels, therefore should the carriage move forward, the friction of the wheels upon the axle tends to turn the reel and assist the men at the cranks in reeling up the hose.

In Fig. 4, is seen a ratchet S which is fixed to the axle. This ratchet moves with the reel, and by means of the pawl-lever F the ratchet and reel may be fixed at pleasure for the purpose of preventing the hose from unreeling.

By this improved carriage, a hose can be reeled up faster and more easily than by any other two wheeled hose carriage now in use.

Having thus fully described our invention, what we claim and desire to secure by Letters Patent of the United States is:

Making the axle of the traveling wheels capable of revolving with the reel independently of the frame and wheels, so that cranks may be used on the ends of the common axle for the purpose of more conveniently and efficiently winding up the hose, substantially as set forth.

JOHN W. WILER.
STEPHEN B. STURGES.
G. McFALL.

Witnesses:
T. B. DODD,
B. F. BLYMYAS.